Figure 1:
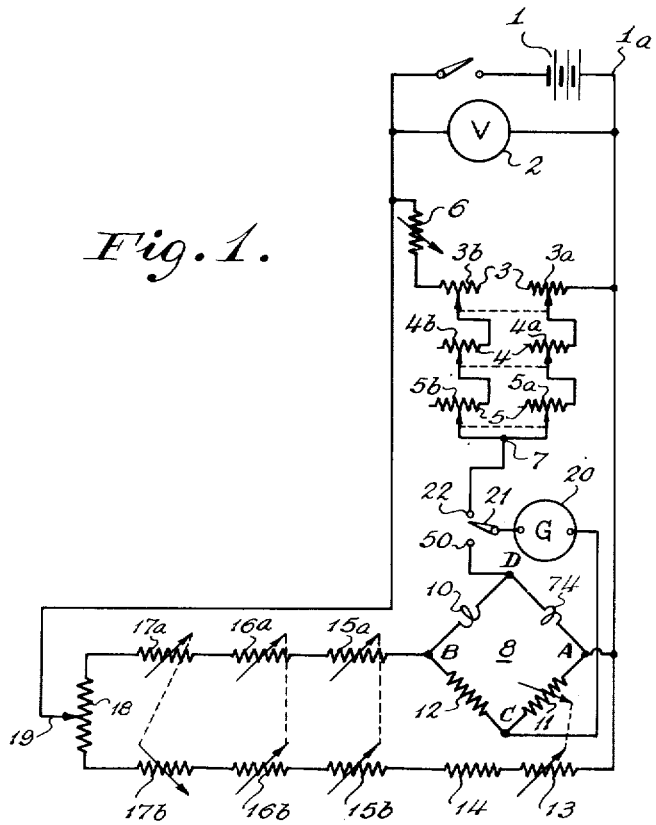

Sept. 22, 1953     E. L. GINZTON     2,653,299
HIGH-FREQUENCY POWER MEASURING APPARATUS
Original Filed Feb. 4, 1942

INVENTOR
EDWARD L. GINZTON
BY
Paul B. Hunter
ATTORNEY

Patented Sept. 22, 1953

2,653,299

UNITED STATES PATENT OFFICE 2,653,299

HIGH-FREQUENCY POWER MEASURING APPARATUS

Edward L. Ginzton, Los Altos, Calif., assignor to The Sperry Corporation, a corporation of Delaware Original application February 4, 1942, Serial No. 429,508. Divided and this application June 27, 1950, Serial No. 170,574

5 Claims. (Cl. 324—95)

This invention relates generally to devices for measuring high frequency power and more specifically to apparatus for use in the absolute measurement of power in ultra high frequency electromagnetic energy transmission systems.

This application is a division of co-pending application Serial No. 429,508 filed February 4, 1942 and now abandoned.

As taught by the aforementioned parent application, a Wheatstone bridge may be arranged with a barretter element and three additional bridge resistor elements, connected and arranged to be supplied with direct current power or low frequency power in such a way as to provide appreciable dissiptation in the bolometer or barretter element and an attendant rise or predetermined change in resistance thereof. Microwave power may then be supplied to the barretter element of the bridge tending to cause a further rise in its temperature, and corresponding further increase in its resistance. By reducing the direct current power or low frequency power to the extent to restore the bridge to a balanced condition (i. e. to return the barretter element to the temperature initially due to D. C. power alone), and by making direct-current measurements to ascertain the extent of the decrease in the direct current power supplied to the barretter unit, the user is enabled to obtain a basically accurate measure of the microwave power supplied to the barretter element.

The present invention has to do with the special feature of arranging one of the bridge resistance elements to be connected adjacent to the barretter element as a temperature compensating resistor, this resistor comprising a coil of wire having appreciable resistance and having a temperature coefficient of resistivity so related to the temperature coefficient of the barretter element as to have the bridge remain balanced over a very wide range of ambient temperatures, assuming substantially constant power conditions prevailing therein.

It is an object of this invention to provide an improved arrangement of the compensating resistor, for achieving the most efficient compensation for changes of ambient temperature, and for making certain that the very fine wire of the barretter element cannot respond to changes of ambient temperature before the compensating resistor is correspondingly affected.

It is another object to achieve a construction of the invention combining efficiency and effectiveness with simplicity of construction.

These objects are met in the present invention by arrangement of the compensating resistor as a coil wound around the outer conductor of a coaxial transmission line, the bolometric or barretter element being included as a portion of the inner conductor of the coaxial transmission line and being surrounded by the compensating resistor winding or a substantial portion thereof.

Figure 2:
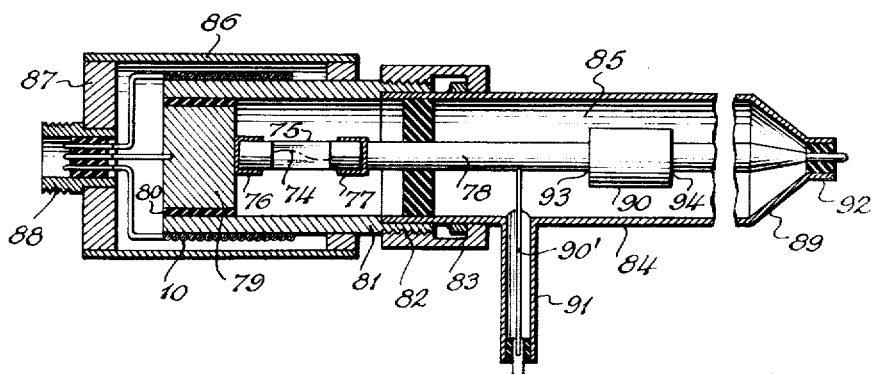

An embodiment of this invention will now be described with reference to the drawings, wherein Fig. 1 is a circuit diagram of a barretter bridge for measurement of ultra high frequency or microwave power, and Fig. 2 is a drawing in cross section of the coaxial line structure including the barretter unit and the compensating winding coaxial therewith and external of the transmission line.

Referring now principally to Fig. 1, the Wheatstone bridge 8 is shown comprising resistors 11 and 12 and temperature sensitive resistors 10 and 14. Resistor 14 is a barretter unit, and resistor 10 is a compensating resistance coil, to be described more fully hereafter. A battery 1 is connected to terminal A of the bridge 8, and is arranged to supply direct current power to the bridge through resistors 18, 17a, 16a and 15a, the last-named resistor being connected to bridge terminal B. These resistors are provided for the purpose of enabling a user of the bridge to control the direct current energization thereof, over a relatively wide range of adjustments. A series of resistors 17b, 16b, 15b, 14 and 13 are connected also between resistor 18 and bridge terminal A to provide a resistance path of substantially equal value to the path through the bridge 8. Resistors 18, 17b, 16b and 15b are arranged for decrease of resistance when the resistances of the elements in the bridge branch circuit are increased, and for increase when the latter are decreased, for keeping a substantially constant current load on battery 1 during the use of the bridge system.

The galvanometer 20 is connected with a double-throw switch 21 in circuit with the bridge 8 and arranged so that the galvanometer may be connected directly between bridge terminals C and D for indicating to the user a condition of balance by neutral reading of the pointer of the D. C. galvanometer, and for indicating the direction and extent of departures from the balanced condition in bridge 8.

A direct current voltmeter 2 and a calibrated decade voltage divider system 3, 4, 5, 6, are connected across the current supply battery 1 for controlling the potential of terminal 7, the potential of this terminal being accurately known at all times by reference to voltmeter 2 and the readings of the decade resistor system 3, 4, 5. One terminal 22 of the double-throw switch 21 is connected to terminal 7 in such a way that the galvanometer 20 may be transferred from its direct connection across the terminals C—D of bridge 8 to a circuit connection enabling the user to ascertain when he has achieved equal potentials at terminal 7 and terminal C of bridge 8—i. e., a potential equal to the potential of terminal D relative to terminal A when the bridge is balanced.

Fig. 2 illustrates the physical arrangement of the barretter 74 and the compensating resistance coil 10, together with suitable structure for efficiently supplying microwave power to the barretter 74. Barretter 74 is illustrated as comprising the fine wire element of a unit commercially known as the Littelfuse. The structure for receiving the Littelfuse cartridge 75 comprises a coaxial transmission line having tubular outer conductor sections 81 and 84 joined together at 82 with a threaded section and a clamping nut 83 for ease of disassembly and replacement of the barretter unit 74, 75.

A high frequency by-pass capacitor is provided in the left-hand end of this coaxial transmission line. This capacitor comprises a fixed piston 79 and a thin layer of solid dielectric material 80, providing for the support of the piston or block 79. One fuse and receptacle cup 76 is attached to the block 79. The other receptacle cup 77 is formed at the left-hand end of the coaxial line inner conductor 78, which, together with the barretter unit, comprises the inner conductor of the coaxial transmission line. The right-hand ends of tubular outer conductor section 84 and inner conductor 78 are tapered down at 89 to appreciably reduced diameters at 92 for connection to a conformal transmission line extending to a microwave energy source.

A stub transmission line section 90', 91 is connected to tubular conductor 84 and inner conductor 78 for providing an external direct current connection to the inner conductor 78. A cylindrical body 90 which may be constructed of highly conductive metal is arranged on inner conductor 78 to be located at a position within conductor 84 for achieving impedance transformation. This block, preferably one-fourth wavelength long, is adjusted to the position along transmission line 78, 84 at which it accomplishes an impedance inversion from the value at its left-hand end due to the barretter and capacitor and the stub 90, 91, into the desired resultant impedance at its right-hand end.

The compensating resistor 10 is wound around the tubular outer conductor section 81 in such a way that at least a substantial portion of this winding surrounds the barretter. The ends of this insulated resistor winding 10 are connected to suitable connector pins in a multicircuit terminal unit 88 which is provided in the end of a protective shell 86, 87, attached to the outer conductor of the transmission line and arranged to shield and protect the compensating winding 10. A connection is also provided between one pin or element of the multicircuit terminal unit 88 and piston or block 79. These terminal connection elements are thus adapted to be connected directly in circuit with the other elements of the bridge 8 (Fig. 1) together with a connection to the terminal formed at the outer end of conductor 90'.

The compensating resistor 10 preferably has substantially equal resistance to the resistance of the barretter wire 74, and also has a substantially equal magnitude as well as similar sign of its temperature coefficient of resistivity. Its length and cross-sectional area are of course of greater order of magnitude than the corresponding dimensions of the barretter element.

In operation of the bridge system, the supply switch in series with battery 1 is closed, and the galvanometer 20 is connected across the bridge circuit by transfer of the switch 21 to contact with terminal 50. The arm 19 of potentiometer 18 is set substantially to its midpoint, and the ganged adjustable control elements of the resistor portions 17A and 17B are set for equal resistance values therein. Resistors 15A and 15B and 16A and 16B are adjusted to relatively low resistance values to provide appreciable direct current energization of bridge 8, and appreciable resultant direct current heading of the barretter 74.

Resistor 11 is adjusted to bring about a condition of balance in the bridge, as indicated by a neutral pointer setting in galvanometer 20.

The switch 21 is now transferred to its opposite throw, and the decade resistor system 3, 4, 5 is adjusted to bring about a neutral indication of the galvanometer 20, and thus to effect the condition that terminal 7 is at the same potential relative to terminal A as is bridge terminal C, and hence, at the same potential as bridge terminal D. This potential value is obtained from the voltage divider settings of the decade voltage divider resistor system 3, 4, 5, 6, taken with reference to the base voltage indicated by voltmeter 2. From this potential value of the direct voltage equal to the potential drop across the barretter 74, and the resistance value of this barretter as indicated by the resistance of resistor 11, the initial direct current power being dissipated in the barretter 74 is obtained by Ohms law as $$P_i = \frac{E_i^2}{R}$$

Now, the high frequency power is introduced in the apparatus of Fig. 2 through the right-hand end 92 thereof, further increasing the temperature of barretter 74, and causing further change of its resistance, bringing about an unbalanced condition in bridge 8. Switch 21 is now transferred to connect the galvanometer 20 across the bridge C, D; arm 11 of the bridge is retained as positioned before the introduction of the high frequency power, and resistors 17a, 17b and 18 are readjusted for increased resistance in the current branch through the bridge and correspondingly decreased resistance of the compensating branch to restore balance in the bridge. Thus, the direct current energization of the bridge 8 is reduced, while the load on battery 1 is retained substantially constant. In this way, the user is assured that the direct current power supplied to the barretter 74 has been reduced to an extent exactly equal to the added increment of high frequency power supplied to the barretter and dissipated therein.

Now, switch 21 is again transferred to connect galvanometer 20 between bridge terminal C and switch terminal 22, and voltage divider system 3, 4, 5 is again adjusted to obtain a neutral indication in galvanometer 20. The reduced direct potential reading of the voltage divider system 3, 4, 5 is now taken, and the square of this voltage divided by the resistance value of the barretter 74 yields the measure of the reduced direct current power supplied to the barretter 74. The difference between this reduced direct-current power value and the initial direct-current power value gives the precise extent of the direct-current power reduction, and hence the magnitude of the high frequency power being dissipated by the barretter.

With ambient temperature changes, the operation of the bridge system is substantially unaffected, since ambient effects are equally applicable to the compensating resistor 10 and the barretter wire 74.

This system of measurement provides the advantages of very high accuracy, and of freedom from dependence upon precalibration by a calorimeter or other high frequency basic measuring device, and also provides for a convenient unit with the barretter for receiving the high frequency power, the system being fully protected against errors arising from ambient temperature changes.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A compensated bridge for use with a high frequency transmission line comprising a pair of standard resistors, a third resistor comprising a wire within an envelope connected in series with the transmission line, said third resistor having a resistance varying in accordance with changes in the high frequency energy, and a temperature compensating resistor, the temperature compensating resistor being in the form of a wire wound around the envelope of the third-mentioned resistor and exteriorly of the transmission line, the standard resistors, said third resistor, and said compensating resistor being connected to form a bridge circuit.

2. In a high frequency wattmeter, a concentric transmission line comprising inner and outer conductors for transmitting said ultra-high-frequency energy, a barretter wire unit disposed in series with the inner conductor, a temperature compensating resistor wound around the outer conductor of said concentric transmission line, and a bridge circuit including said barretter wire unit and said temperature compensating resistor as arms of the bridge, the balance of the bridge being affected by changes in resistance of the barretter wire unit with changes in the high frequency energy transmitted by the transmission line.

3. Apparatus for measuring high frequency energy, said apparatus comprising a section of coaxial line adapted to transmit said high frequency energy, the coaxial line having an inner conductor and an outer conductor, a barretter wire unit disposed in alignment with said inner conductor and connected in series therewith, a temperature compensating resistor in the form of a resistance wire coil concentrically positioned around the coaxial line section and said barretter wire unit, a direct current source, said barretter wire unit and compensating resistor being connected in series across said direct current source, a pair of standard resistors connected in series across said direct current source, and a galvanometer connected between the junction of said standard resistors and the junction of the barretter wire unit and the temperature compensating resistor.

4. A high frequency power sensitive apparatus suitable for use in a bridge wattmeter circuit, said apparatus comprising a coaxial line section having an inner conductor and a tubular outer conductor, capacitor means connected between said inner and outer conductors adjacent one end of the coaxial line section, said capacitor means providing an effective short circuit to high frequency current and an effective open circuit to direct and low frequency currents, a resistance element connected in series with the inner conductor, a coil of resistance wire wound around the other portion of the outer conductor and surrounding the resistance element, the resistance and temperature coefficient of resistivity of the coil being substantially equal to the resistance and temperature coefficient of resistivity of the resistance element, shielding means enclosing the coil, and electrical conductor means for providing external connections between the bridge wattmeter circuit and the coil and resistance element respectively, the length and cross-sectional area of the resistance wire in the coil being many times greater than the length and cross-sectional area, respectively, of said resistance element, whereby the resistances of the coil and resistance element change equally with ambient temperature changes but only the resistance of the resistance element is affected materially by changes in current therethrough.

5. Apparatus as defined in claim 4 wherein said electrical conductor means includes a quarter wavelength coaxial stub having an inner and outer conductor, the inner conductor being connected to the inner conductor of said coaxial transmission line section adjacent the resistance element for providing an external direct current connection to the resistance element.

EDWARD L. GINZTON.

References Cited in the file of this patent

UNITED STATES PATENTS

| Number | Name | Date |
|---|---|---|
| 1,673,681 | Hull et al. | June 12, 1928 |
| 2,127,408 | Kaar | Aug. 16, 1938 |
| 2,270,949 | Hulster | Jan. 27, 1942 |
| 2,274,346 | Roosenstein | Feb. 24, 1942 |
| 2,344,298 | Green | Mar. 14, 1944 |
| 2,405,174 | Aford | Aug. 6, 1946 |
| 2,435,442 | Gurewitsch | Feb. 3, 1948 |
| 2,464,277 | Webber | Mar. 15, 1949 |
| 2,473,495 | Webber | June 14, 1949 |
| 2,516,944 | Barnett | Aug. 1, 1950 |

Certificate of Correction

Patent No. 2,653,299 September 22, 1953

EDWARD L. GINZTON

It is hereby certified that error appears in the printed specification of the above numbered patent requiring correction as follows:

Column 6, line 25, for "other" read *outer*;

and that the said Letters Patent should be read as corrected above, so that the same may conform to the record of the case in the Patent Office.

Signed and sealed this 10th day of November, A. D. 1953.

[SEAL]

ARTHUR W. CROCKER,
*Assistant Commissioner of Patents.*